(12) United States Patent
Hartman

(10) Patent No.: US 8,348,618 B2
(45) Date of Patent: Jan. 8, 2013

(54) MASS PRODUCED COMPOSITE WIND TURBINE BLADES

(76) Inventor: Paul Harvey Hartman, Chardon, OH (US)

( * ) Notice: Subject to any disclaimer, the term of this patent is extended or adjusted under 35 U.S.C. 154(b) by 326 days.

(21) Appl. No.: 12/798,616

(22) Filed: Apr. 8, 2010

(65) Prior Publication Data

US 2010/0226775 A1    Sep. 9, 2010

Related U.S. Application Data

(62) Division of application No. 12/381,104, filed on Mar. 6, 2009, now Pat. No. 8,013,569.

(51) Int. Cl.
 *F03B 3/12* (2006.01)
(52) U.S. Cl. .................................. 416/210 R
(58) Field of Classification Search .............. 416/223 R, 416/226, 232, 233, 241 R, 241 B, 241 A, 416/239, 210 R, 211; 244/123.1, 123.2, 244/123.3, 123.4, 123.5, 123.6, 123.7, 123.8, 244/123.9; 52/650.2, 80.1, 837, 84, 245
See application file for complete search history.

(56) References Cited

U.S. PATENT DOCUMENTS

| | | | | |
|---|---|---|---|---|
| 3,174,711 A * | 3/1965 | Sullivan | ..................... | 244/123.1 |
| 3,798,867 A * | 3/1974 | Starling | ......................... | 52/834 |
| 4,048,947 A | 9/1977 | Sicard | | |
| 4,180,367 A | 12/1979 | Drees | | |
| 4,366,387 A * | 12/1982 | Carter et al. | .................... | 290/55 |
| 4,409,050 A * | 10/1983 | Carter et al. | .................. | 156/172 |
| 4,430,044 A | 2/1984 | Liljegren | | |
| 4,535,958 A * | 8/1985 | Hutchison | .................. | 244/123.8 |
| 5,499,904 A | 3/1996 | Wallace | | |
| 6,261,064 B1 * | 7/2001 | Tang | ......................... | 416/210 R |
| 6,341,467 B1 * | 1/2002 | Wycech | .......................... | 52/834 |
| 6,347,924 B1 * | 2/2002 | Chang | ...................... | 416/210 R |
| 6,699,014 B1 * | 3/2004 | Lam et al. | ......................... | 416/5 |
| 6,796,770 B2 * | 9/2004 | Gigas et al. | .................... | 416/226 |
| 6,805,535 B2 * | 10/2004 | Tiemann | ....................... | 416/233 |
| 7,329,099 B2 | 2/2008 | Hartman | | |
| 7,329,965 B2 | 2/2008 | Roberts et al. | | |
| 7,344,353 B2 | 3/2008 | Naskali et al. | | |
| 7,393,177 B2 | 7/2008 | Rahai et al. | | |
| 2006/0249626 A1 * | 11/2006 | Simpson et al. | ........... | 244/123.1 |
| 2010/0080952 A1 * | 4/2010 | Suzuki et al. | ................. | 428/113 |

OTHER PUBLICATIONS

Pawsey, N., Dev't and Evaluation of Passive Variable-Pitch Vertical Axis Wind Turbines, Thesis: U. New South Wales, AUS, Nov. 2002.
Flowind Corp., Final Project Report: High Energy Rotor Dev't, Test & Evaluation, Sandia Labs, SAND96-2205, USA, Sep. 1996.
Migliore, et al, Feasibility Study of Pultruded Blades for Wind Turbine Rotors, Feb. 2000, NREL/CP-500027506, Golden, CO.
Musial, et al, Four-Point Bending Strength Testing of Pultruded Fiberglass Wind Turbine Blade Sections, Sep. 2001, NREL/CP-500-30565, Golden, CO.

* cited by examiner

*Primary Examiner* — Richard Edgar
*Assistant Examiner* — Aaron R Eastman

(57) ABSTRACT

A tiered structural assembly for wind turbine blades that reduces stress on the airfoil profile is shown. The wind turbine blades and rotor assemblies for capturing the wind resources show significant improvements in both cost of manufacture and site assembly compared to three-bladed horizontal axis turbines. A simple, easily manufactured blade pivoting mechanism is shown to improve the performance of vertical axis turbines. A related improvement for varying blade pitch along the axis of horizontal axis turbine blades allows for production using continuous mass-production methods rather than the labor and cost intensive current practice of molding the blades. The blade assemblies are scalable and suited to areas with moderate wind resources.

10 Claims, 9 Drawing Sheets

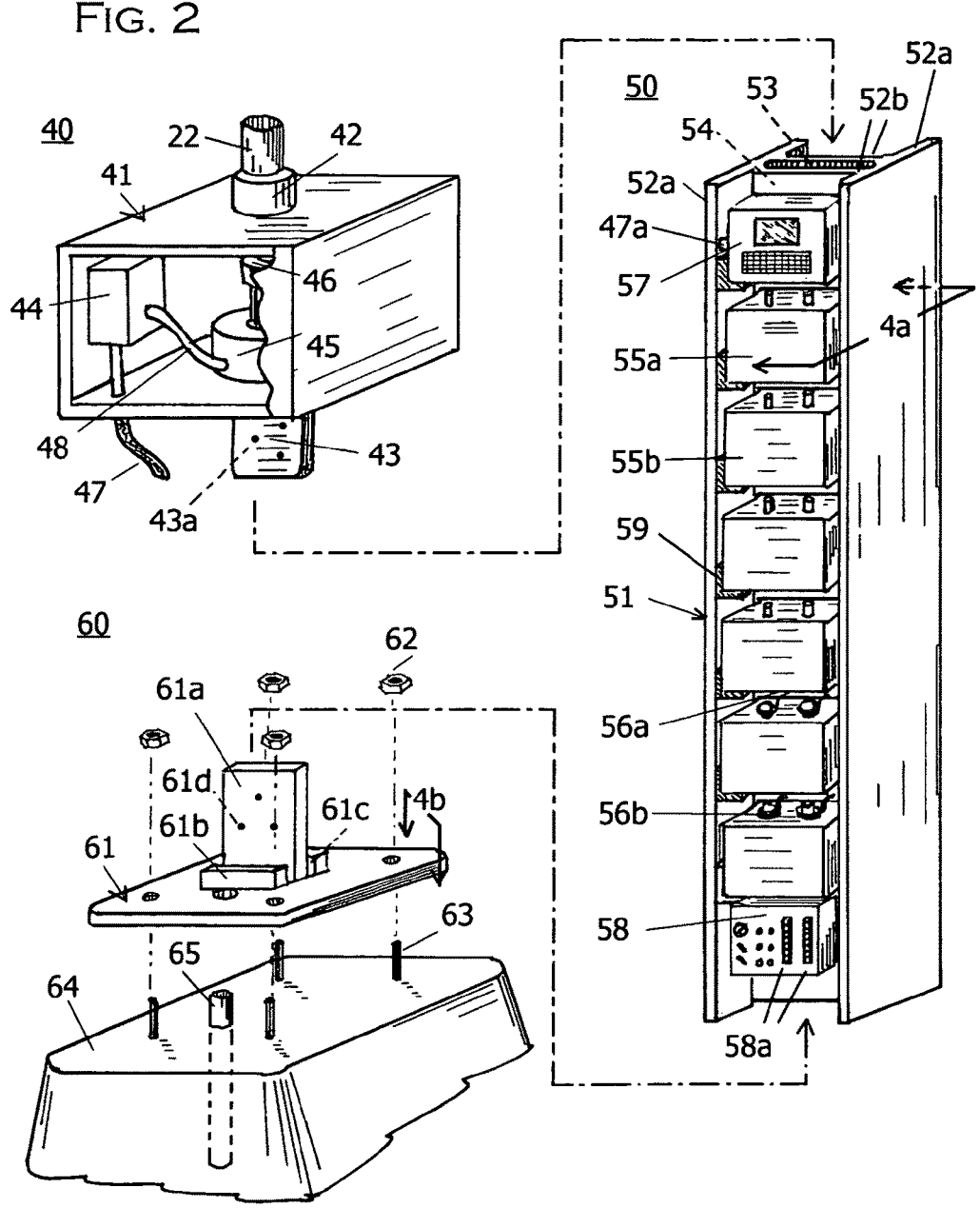

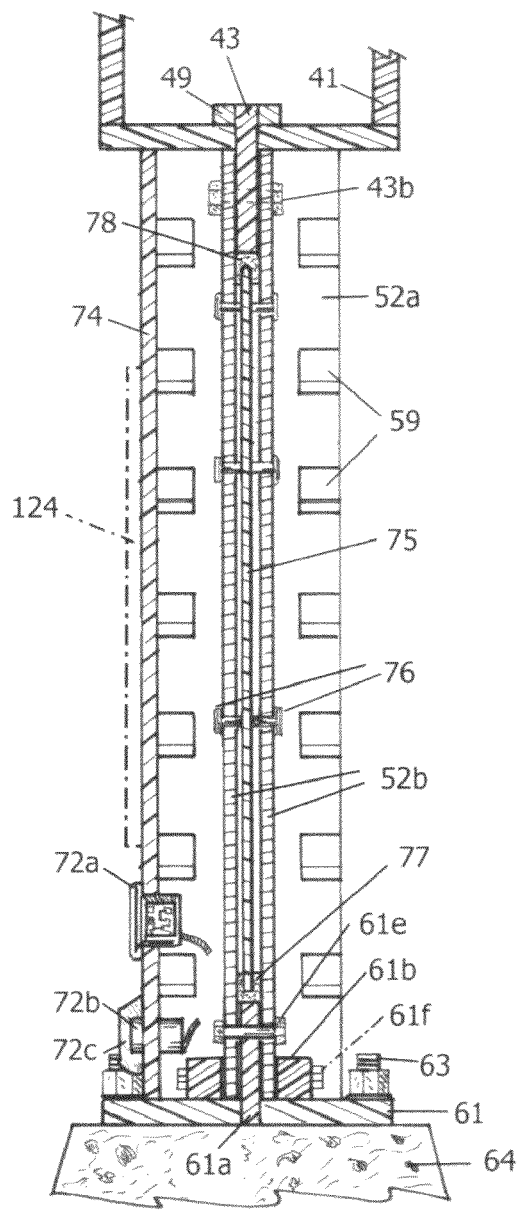
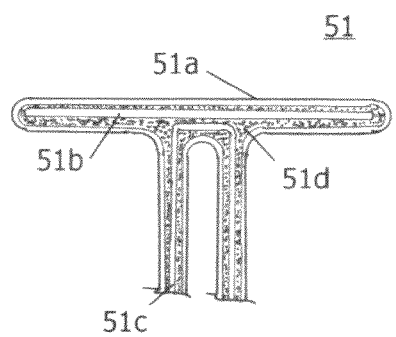
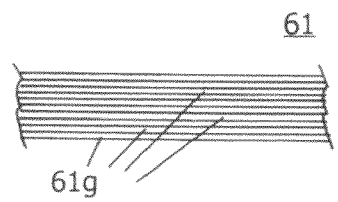

MASS PRODUCED COMPOSITE WIND TURBINE BLADES

This is a divisional application of application Ser. No. 12/381,104 by Paul H Hartman, (US Citizen), Chardon, Ohio made on Mar. 6, 2009 now U.S. Pat. No. 8,013,569 for a Renewable Energy Vehicle Charging Station.

BACKGROUND

1. Field of the Invention

This invention relates to an improved construction for vertical and horizontal axis wind turbine blades.

2. Prior Art

Recent emphasis on energy independence, economics and the effects of climate change has led to a re-thinking of the rate of conversion to alternative fuel supplied vehicles. Nearly all major auto makers presently have or are planning hybrid, plug-in hybrid and all electric vehicles in addition to expanding lines of natural gas fueled and alcohol fueled cars into the US from established markets elsewhere.

Better Place, a firm with a number of international and domestic electric car charging/parking lot installations, utilizes alternating current supply posts put in as branch circuits to accomplish a goal of supplying purchased 'green electricity' generated remotely from the site to the vehicles. Sources of economical green electricity in proximity to points of use are extremely rare.

Very large, three blade horizontal axis turbines (HAWT) are the central hope for use in supplying pollution free electrical demand to meet the needs of the national distribution grid. But they require a massive thickness of expensive composite materials at the blade root and roughly 600 man-hours of labor for each blade.

They are not economical in areas with moderate winds because of the cost elements cited above, the cost of the heavy nacelle assembly and its structural support, costs of the grid interface and the mechanism for directing the turbine into the wind. As manufacturers have steadily increased the size of the turbines and built more of them, cost per kilowatt hour has gone up . . . not down.

Rather than addressing the obvious limitations of HAWT, many are recommending transcontinental transmission from high wind areas to high population areas to meet growing energy needs. One drawback of this approach was illustrated within the report on the August 2003 power outage: Electricity purchased from utilities outside of service areas grew from 18% of total use in 1989 to about 40% of total use in 2002. Moving enough electricity across the country to both meet existing needs and electric vehicle needs from wind sites in the Great Plains area will require very expensive high voltage transmission lines and corridors. Writing off functioning coal fired power plants before they are obsolete is beyond the economic capabilities of the country.

Every kilowatt hour (kWh) of energy delivered to an end user, requires of 3.23 kilowatt hours of coal energy at a power plant. As stated by the Department of Energy, 'energy security' is best provided by distributed energy sources. Therefore, the use of wind energy in distributed power generation in many applications including replacement of fossil fuels has emerged as an important new option. Hartman (U.S. Pat. No. 7,329,099, 2008) shows a vertical axis design for generating heat to displace natural gas in HVAC systems and to cut coal-based electrical power emissions in existing power plants with nearby off-shore wind.

A number of earlier inventions for vertical axis turbines obtained good efficiency and self-starting capability through pivoting blades to optimize lift throughout the rotational cycle. This permitted lower costs through reducing materials usage relative to horizontal turbines. The mechanical complexity of the pitch control, however, may have been a factor contributing to the displacement of vertical turbines by horizontal turbines over the past two decades.

Sicard (U.S. Pat. No. 4,048,947, 1979) used a combination of counterweights and aerodynamic forces to orient blades to minimize drag around the circuit of rotation of a vertical turbine. Blades illustrated by Sicard are simple pipes to ease the mechanical requirements of the pivoting motion with trailing edges bonded to the pipe sections to form an airfoil.

Drees (U.S. Pat. No. 4,180,367, 1979) achieved self-starting characteristics in the 'Cycloturbine' by imposing an orientation at the retreating blade position perpendicular to the ambient wind direction at low starting speeds. He had an orientation parallel to prevailing wind at operational wind speeds. Mechanical actuation of the system was by cam and pushrods to each blade . . . not a significant improvement on the internal combustion engine in terms of simplicity.

Liljegren (U.S. Pat. No. 4,430,044, 1984) utilized similar cams and pushrods to control the pitch of the blades of a vertical axis turbine during the rotational cycle. This system differs from Drees in orienting both the blade positions approaching and receding from the prevailing wind roughly parallel to the tangent of the rotational circle to limit drag; Aiming for lift-based power throughout the rotational cycle and a wider range of operational speeds of the machine.

Given that improvements in vertical turbine performance can be achieved with small amounts of pitch variation, (Thesis, Pawsey, 2002), it is likely that complex mechanical drive mechanisms for pitch control used in these earlier inventions could be supplanted by simpler alternatives.

Vertical axis designs using drag based impellers have emerged to supply small amounts of site generated electricity in buildings. Naskali (U.S. Pat. No. 7,344,353, 2008) and Rahai (U.S. Pat. No. 7,393,177, 2008) are two examples of improvements on the earlier Savonius style. While effective, the complex shapes and large chords of these reactive surfaces limit the scale of the systems and increase unit electricity costs due to the complex forms.

While the approach to the orientation of the approaching and receding blades seen in Liljegren is appropriate for vertical turbines with two or three blades and low solidity, it is based on the assumption that the prevailing wind is the same as the wind direction moving around and through a vertical turbine. Studies of airflow around cylinders and consideration of the Magnus effect show that this assumption may be inadequate to capture the flow field of a vertical turbine, particularly at high solidity and/or multiple blades.

Roberts (U.S. Pat. No. 7,329,965, 2008) recognizes the importance of considering flow through the turbine assembly in his design for an "Aerodynamic hybrid" vertical turbine; but is also limited by the size and fabrication complexity factors discussed above for drag type turbines.

FloWind Inc. in conjunction with Sandia Labs conducted experiments in the late 1980s/early 1990s to reduce cost and improve performance in Darrieus style vertical turbines used in early utility installations by replacing extruded aluminum blades with composite pultrusions, (SAND 96-2205, 1996). While reasons are unclear; the newer, more elongated turbine rotor design and Sandia blade aerodynamics did not result in significantly higher efficiency or any reduced cost.

Wallaces pultrusion (U.S. Pat. No. 5,499,904 to FloWind) was large and complex, with a chord of 27 inches and four cavities in the profile separated by web portions. Production of the system using the pultrusion process was likely difficult.

The field bending of the 158 ft long turbine blades into a troposkein curve was also a limitation on practicality.

Hartman (U.S. Pat. No. 7,329,099, 2008) produced a dome structure based on straight blades used as dome struts with an initial approach to variable pitch throughout the rotation. The two cavity pultrusion was simpler than that of Wallace, but there remain some issues with the design of the blade—hub attachment system and the need for simple, adaptable blade pitch control.

The new emphasis on distributed power opens up a number of new wind applications; such as local recharging of hybrid or all-electric vehicles and mid-scale wind power generation at industrial/commercial buildings, if significant cost reduction over HAWT electrical generation and drag-based, complex shape, vertical axis units could be demonstrated.

OBJECTS AND ADVANTAGES OF THE INVENTION

Accordingly, one object of the invention is to produce low cost, efficiently produced blades for use in vertical and horizontal axis turbines. A second object of the invention is to replace complex systems of mechanical pivots, stops/springs and cams with simpler, more robust systems to allow pitch control and pivoting of turbine blades through the rotational cycle of a turbine. Practical systems suited to addressing emerging needs for locally produced renewable energy in populated areas with Class 2 and Class 3 (moderate) winds are another object of the invention.

SUMMARY OF THE INVENTION

To address these objectives, a first aspect of the invention is to provide a single cavity, pultruded airfoil shape that can be combined with a simple I beam pultruded profile to produce a very low cost composite blade for wind turbines.

This two part assembly strategy allows for blade angles relative to the perimeter of turbine rotation that can be easily adjusted to allow for varying amounts of heel-in or heel-out angle that form the rest point of a blade pivoting system.

A second aspect of the invention is the use of a composite section as a replacement for the complex pivot shaft and stops/springs in prior art vertical blade pivoting assemblies. The composite functions as a simple torsion spring during the rotational cycle and an easy tie point to hub junctions for the blades in a turbine rotor assembly.

BRIEF DESCRIPTION OF THE DRAWINGS

FIG. 2 is an isometric assembly drawing of the energy storage/structural stanchion and generator housing for the wind turbine shown in FIG. 1.

FIG. 3 is a cross section of the stanchion showing additional electrical and structural components of the renewable energy vehicle fueling system.

FIGS. 4a and 4b are cross sections through two different types of composites used in both the parent and divisional inventions.

DETAILED DESCRIPTION

Support Stanchion with Integrated Vehicle Charging System

1. FIGS. 1 through 5 disclose the invention of application Ser. No. 12/381,104: A composite stanchion 50 and associated electric equipment with the capability to both support a vertical axis wind turbine rotor 21 and to store/supply energy for hybrid or electric vehicles 79. Stanchion 50 can also support an elevated solar array 30 having an adjustable pitch mechanism for optimum solar collection capability.

2. Through public facilities to provide for direct supply of vehicle energy from renewable sources; new demand on an already stressed grid structure and carbon emissions from vehicle sources can both be minimized. Additionally, the renewable energy supplied from the invention can be easily utilized for emergency power supply to a nearby building or local grid area for greater energy assurance.

Figure 1:
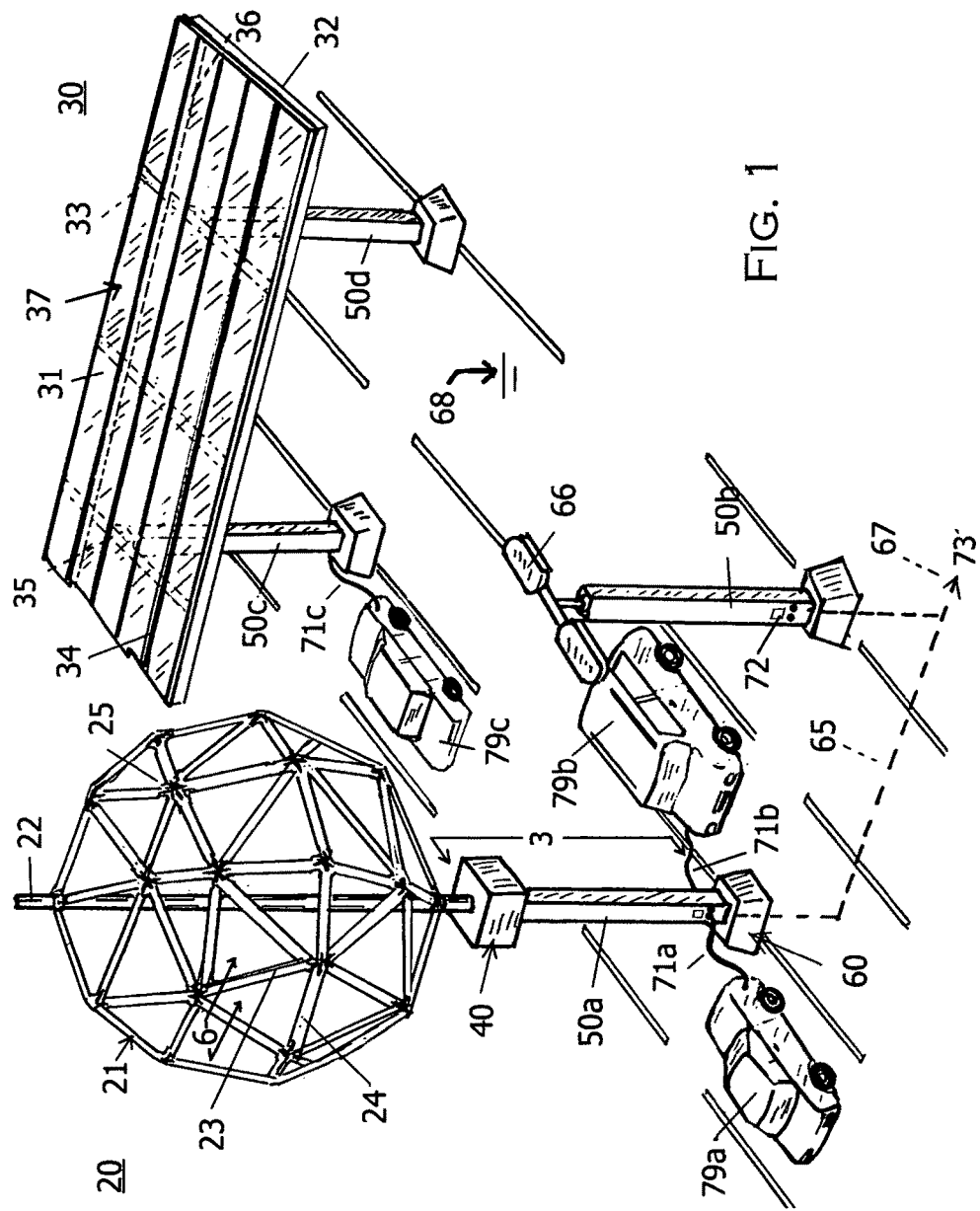
FIG. 1 is a birds eye view of a parking lot area equipped with both wind and solar energy vending systems for charging vehicles.
Figure 5:
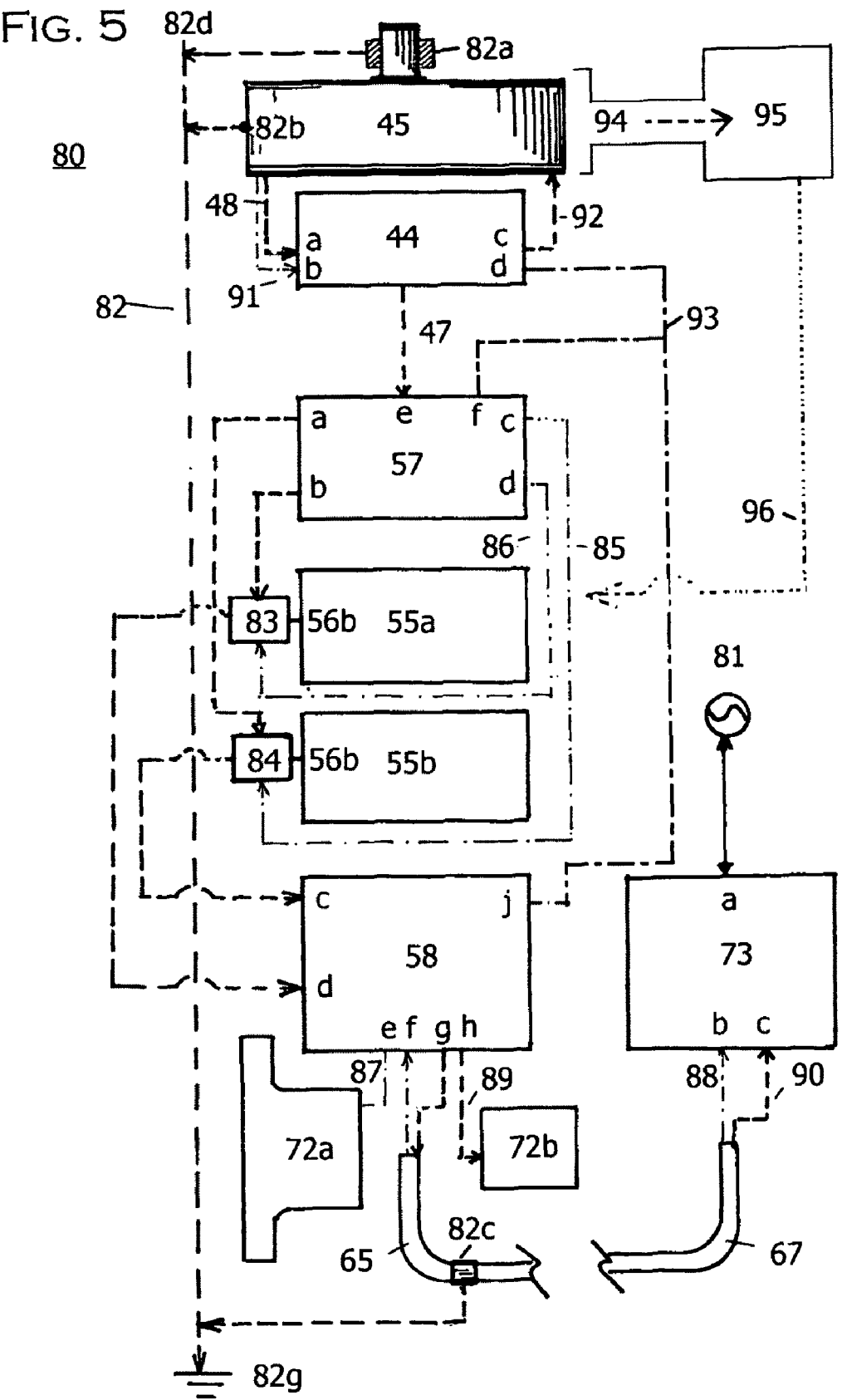
FIG. 5 is a process and instrument drawing of the control and electrical supply components and their interconnections for a wind turbine vehicle charging station.

3. FIG. 1 is an overview of a parking lot 68, with vehicles 79a, b and c are in the process of being charged through cables 71a, b and c with power supplied by support stanchions 50a and 50c. Wind turbine assembly 20 consists of a wind turbine rotor 21, a housing 40, a stanchion 50a and a base assembly 60. Although a vertical turbine design based on U.S. Pat. No. 7,329,099 is illustrated in the figure, another wind turbine design could be used in conjunction with the support stanchion and energy supply system.

4. Support stanchion 50b carrying lighting fixture 66 is shown with buried conduit 65 for utilization of energy generated by turbine assembly 20 for electrical energy storage in stanchion 50b or night lighting of the parking lot. Fixture 66 is preferably a DC supply, high intensity discharge luminaire capable of operation off stanchion supplied voltage at high efficiency.

5. An extension 67 of conduit 65 can be utilized to connect to and utilize energy from a grid connected panel 73 associated with the lot for the purpose of supplying backup power to any of the stanchions, 50 a through d for charging vehicles or lighting in time of low renewable energy supply. Alternatively, extension 67 can be configured to deliver excess electrical supply to a building or service supply grid as needed through panel 73.

6. Solar array 30 consists of a series of photovoltaic solar structural panels 31 supported by a perimeter frame 32 and intermediate beams 33 tied to stanchions 50c and 50d. Integral purlins 36 within panels 31 provide tie members between the beams, which are in turn are connected to stanchions 50c and 50d with a hinged connector 35 to control the pitch of the array. Inter-panel connectors 34 add to the diaphragm strength/racking resistance of the overall solar platform deck 37 in areas with seismic structural concerns.

7. Although a 'portal' assembly of stanchions and deck is shown in the illustration, individual support of deck sections with individual stanchions could also be achieved with the system. It is not intended to limit the scope of the invention to either a pivoting or fixed pitch assembly of the solar collector deck.

Figure 7:
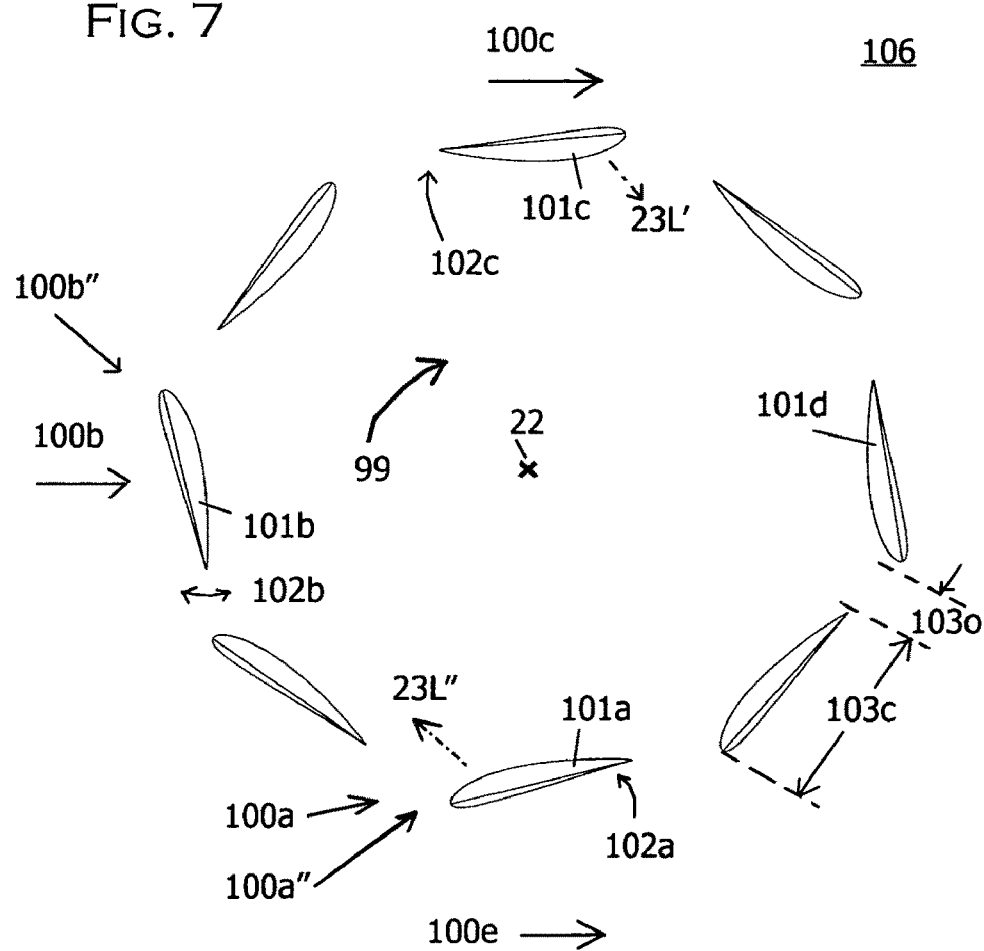
FIG. 7 is a schematic illustration of the pivoting blades throughout a rotational cycle.
Figure 8:
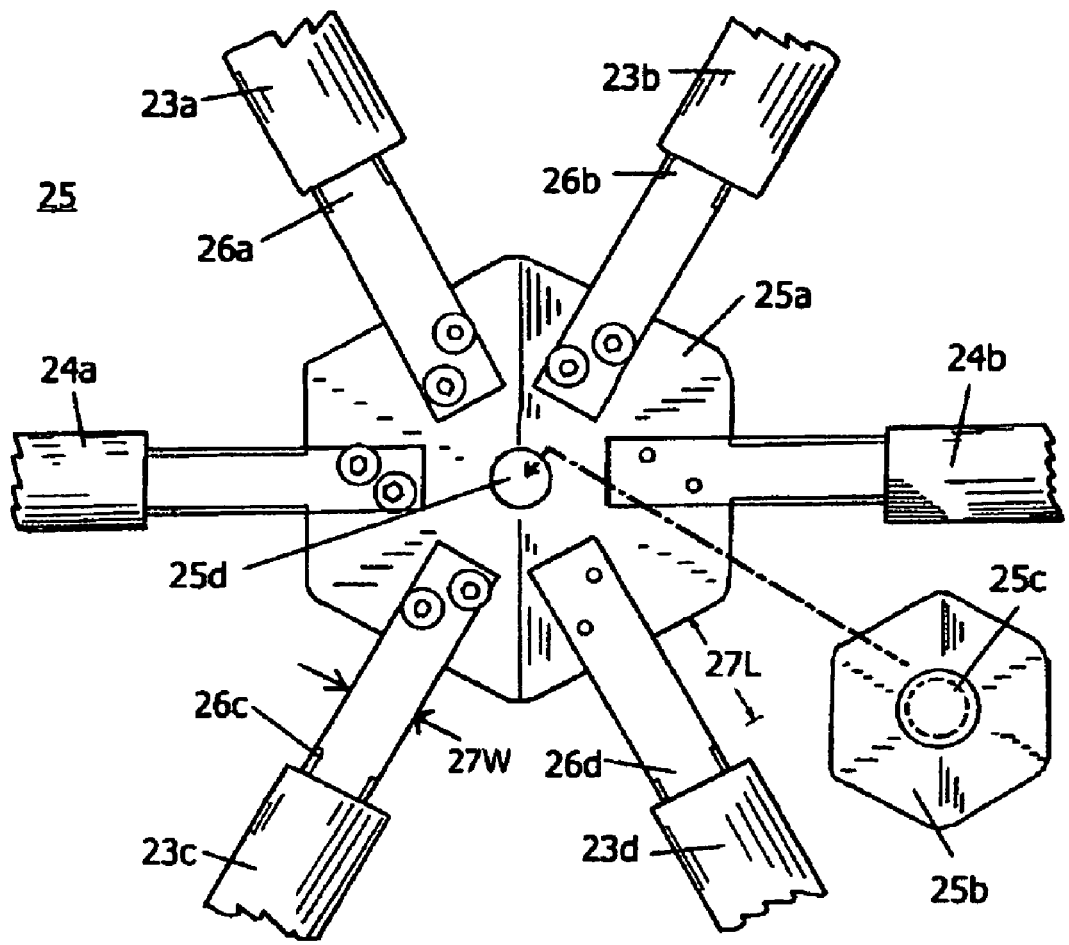
FIG. 8 is an isometric assembly drawing of a turbine blade hub.

8. A more detailed description of improved turbine blades 23, hub assembly 25 and information on a simple blade pitch control system 106 is provided in the specification associated with FIGS. 6 through 16. The connection of mast 22 through housing 40 to generator 45 is detailed in FIG. 2. Non-blade dome struts 24 are also shown in FIGS. 1 and 8.

9. FIG. 2 is an assembly drawing of wind turbine assembly 20 divided into sections according to sketches of a housing 40, a stanchion 50 and a base assembly 60. Mast 22 passes through a housing frame 41 by means of a bearing/seal assembly 42 and ends at a rotary coupling 46 to the shaft of a direct current generator 45. Power output of generator 45 is conducted into power conditioning panel 44 through wiring 48. Conditioned power is then supplied to programmable controller 57 through flexible conduit 47 which is later attached at conduit fitting 47a to stanchion 50. Another type of generator, such as a synchronous one, could be used within the scope of the invention.

10. Anchor blade 43 is structurally bonded to housing 41 at the bottom and is later inserted into a slot 53 between double web sections 52b of pultruded composite profile 51. Web sections 52b are connected to the center points of flanges 52a to make up the structural support of stanchion 50.

11. In the installation process, profile 51 is mounted on post 61a by means of slot 53 and secured in place, Housing 40 is later installed by means of anchor blade 43. Holes in parts 61a and 43, (61d and 43a respectively), correspond to additional bolting during assembly that cannot be seen in the FIG. 2.

12. FIG. 3 is a cross section through stanchion 50a detailing additional structural and electrical features of the invention not shown earlier. Anchor blade 43 is shown passing through the bottom of housing frame 41 and additionally bonded to support blocks 49 inside of housing 40. Fastener 43b is shown securing the assembly through holes 43a. Ideally, the blocks, housing frame and anchor blade are connected by both adhesive bonding and dowel pinning with composite pins.

13. Similarly, post 61a is shown passing through plate 61 to secure the post to the base plate. Additionally blocks 61b to form a socket 61c for web sections 52b. The lower joint is bolted by means of fastener 61e passing through the web sections 52b and post 61a. Additionally, optional fastener 61f is shown passing through blocks 61b, profile 51 and post 61a. Alternatively, base 61 and stanchion 51 can be pre-assembled with adhesive bonding means and shipped to the field assembly site as a single unit.

14. FIG. 4a is a cross section through pultruded stanchion profile 51 illustrating the composite structure. In an application requiring both transverse and longitudinal strength outer layer 51a would typically be a triaxial stitched fiberglass fabric. Unidirectional glass roving layers 51d typically separate layers of glass fabric and a very useful in filling corner areas such as the one at the end of the indicating arrow of character 51d. Both non-woven glass fabric and other glass fabrics such as stitched 0/90 fabrics can be used effectively in central layers 51b and 51c. A variety of resin materials such as epoxy, urethane, phenolic, polyester and vinyls are often used, with urethane often being the choice for high strength constructions and phenolic resins being chosen for fire safe constructions.

15. FIG. 4b is a cross section through laminated composite base 61 showing multiple layers 61g preferably composed of woven glass fabric. Commonly, these 'B-stage layers' made from partially cured epoxy or phenolic resin systems that are cut, stacked and laminated in a high temperature, high pressure presses to complete the polymerization process and form laminated composite base 61.

16. The resultant products have good bi-directional properties and compression strength for the application. Alternative reinforcement materials can include cellulose, other fibers derived from natural products and carbon fibers/fabrics, aramid and other high strength organic fibers and rock wool or fibers produced from lava. Although composite materials represent a preferred embodiment of stanchion 50 and base 61, these components could as easily be fabricated from steel, another commodity metal or from properly reinforced concrete materials. Stanchions fabricated from metals would not, however, have the desirable non-conductive and chemically resistant properties that would be desired in the renewable energy charging station.

DETAILED DESCRIPTION

Blade Construction and Pivoting Mechanism

17. FIGS. 1 and 6 through 16 show the invention in the form of a low cost, high strength turbine blade construction with an integral blade pivoting mechanism 106 and hub attachment means. Turbine blades 23 and 110 show the use of flat, composite torsion members to replace the complex systems of pivot rods, springs and cams used in prior art such as Drees.

18. By reducing the cost and weight of composite turbine blades and using them in vertical axis wind turbine rotors 21 and 108, savings can be achieved relative to HAWTs throughout the turbine including the rotor, housing, tower, support structure and assembly costs.

19. By simplification of the blade pivoting and assembly mechanism, good electrical generation efficiency with a more robust design for reduced maintenance can be achieved in areas with modest wind resources that are located in close proximity to where energy is being used.

20. Both of these improvements will lead to easily deployable, lower cost systems that can be mounted lower to the ground avoiding some of the restrictions and difficulties in mounting large utility grade HAWTs hundreds of miles from the point of use and hundreds of feet in the air.

21. The delays in creating transmission systems to move power across the country, the significant transmission losses and losses/costs associated with inverters to create AC power and later rectify to DC power for vehicle batteries can be avoided.

Figure 6:
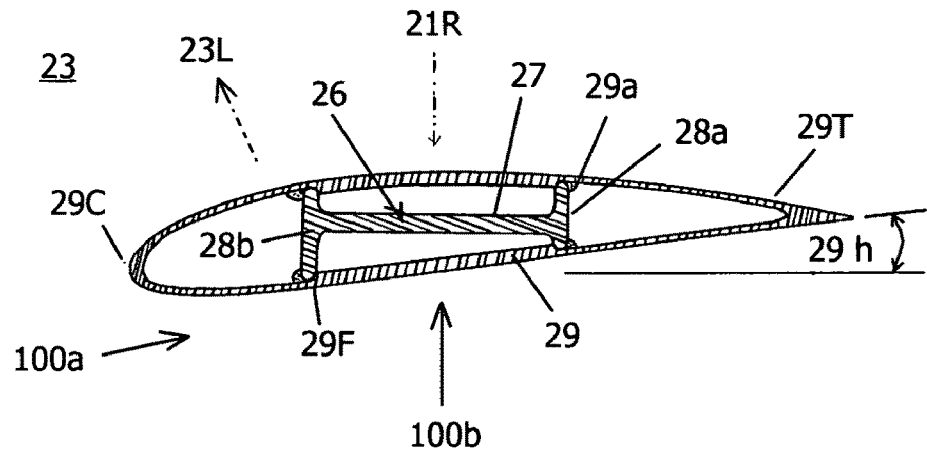
FIG. 6 is cross section through the composite blade structure of the invention.

22. FIG. 6 is a cross section through blade 23 in FIG. 1 showing a two part assembly made of pultruded composite materials as described in FIG. 4a. An unsymmetrical I beam 26 is bonded to an airfoil profile 29 using adhesive 29a to form blade 23. Web section 27 of I beam 26 is integral to shorter flange portion 28a and longer flange portion 28b. The center points of the two flange portions are offset from one another and the mid-plane of web section 27 to create a heel-in angle 29h relative to the plane of web section 27 and the tangent of the rotational motion 99 of blade 23 about mast 22. Airfoil profile 29 is a cambered design similar to an NACA 4415 shape in cross section; but the invention is not intended to be limited to either this airfoil shape, a cambered design or a heel-in orientation in every application.

23. From a standing start and at low wind speeds, heel-in angle 29h allows blade 23 to add to rotational power when facing prevailing wind vector (arrow 100b) at blade position 101b in FIG. 7 through an impeller type of response to the air flow. The heel-in angle also allows an aerodynamic lifting force, arrow 23L, at startup in blade position 101a facing localized wind vector 100a.

24. Test comparisons with an un-cambered blade design and with a cambered design having a heel-out configuration at position 101a relative to prevailing air-flow direction 101b showed a lack of self-starting characteristics for a turbine rotor of the type shown in FIG. 1. When the heel-in configuration was used in conjunction with a cambered blade profile, the turbine rotor was seen to have self-starting characteristics.

Figure 9:
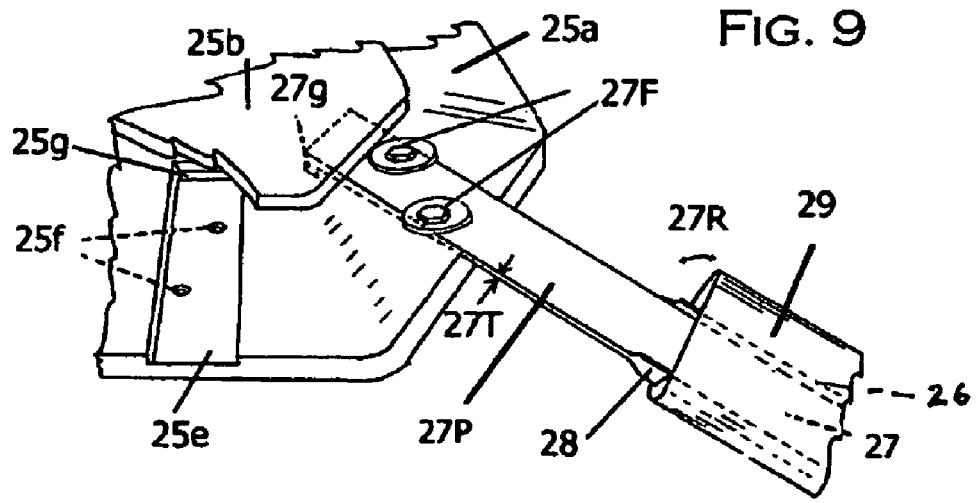
FIG. 9 is a detail assembly drawing of turbine blade attachment to a hub.

25. FIGS. 8 and 9 show the connection and blade pivoting system of the invention based on assembly drawings at hub assembly 25 in FIG. 1. Blades 23 a through d in the figure are tied to a molded hexagonal hub section 25a by fasteners 27F. FIG. 9 shows I beam 26 extending beyond airfoil profile 29 and trimmed of flange portions 28 in the area between profile 29 and hub section 25a.

26. Web section 27 continues as flattened portion 27P toward the hub and has a thickness 27T, a width 27W and a length 27L in that area. Combined with the torsional properties of the pultruded web section, the dimensions in that area can be used to fine tune the spring response, indicated by arrow 27R of airfoil profile 29 to the centrifugal and aerodynamic forces on it. The torsional modulus of the material and the moment of inertia as defined by the flattened portion dimensions are chosen so as not to exceed the elastic limit of the material under expected loads encountered, so that the blade will always return to the same rest pitch position after rotation.

27. Locking cap 25b with an integral molded fastener 25c is shown detached in FIG. 8 and secured to hub section 25a in FIG. 9. As shown in FIG. 8, fastener 25c is inserted through hole 25d in the assembly process to secure the blades and I beams 26 a through d to hub section 25a. At the end of each web section 27 a small ledge 27g is formed by an over-molding process after flange portions 28 have been trimmed.

28. Each trimmed web section 27P fits into a rectangular slot 25e in hub section 25a with a ledge 27g fitting into with a deeper channel 25g during field assembly of blades 23 to hub sections 25a. The field assembly is completed by inserting and tightening fasteners 27F into threaded holes 25f at slots 25e, securing non-blade struts 24a and 24b in a similar fashion and aligning/locking all six components to the plane of hub section 25a with locking cap 25b.

29. Non-blade struts 24a and 24b, as illustrated in FIG. 8, can have a more circular cross sectional profile compared to airfoil profile 29 to optimize strength to weight ratio and also be adapted to receive I beam sections (not numbered) similar to 26a to d for attachment to hub section 25a.

Figure 13:
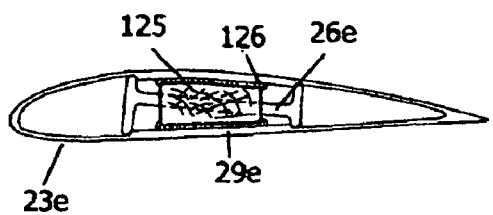
FIG. 13 is a cross section of an alternate material use using a wood insert.
Figure 14:
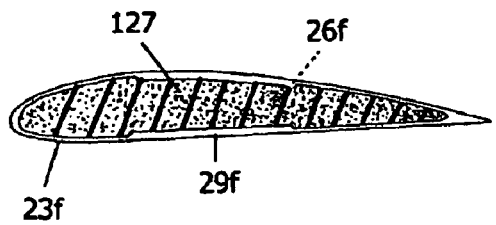
FIG. 14 is a cross section of an alternate material use using a foam filled airfoil.

30. FIGS. 13 and 14 show a materials arrangements for further reducing turbine blade cost which can be employed using the system. FIG. 13 is a section through an alternate materials construction of the invention, with aerodynamic profile 29e of blade 23e, connected to an assymetrical I beam 26e only at the ends of the blade. A light weight wood section 125 is bonded to profile 29e with adhesive 126 at the center of a blade span to transfer the load between the sides of profile 29e in that area. Wood varieties such as pine, fir, ash and hickory would be ideal in this application.

31. FIG. 14 illustrates a foam section 127 performing a similar function at mid-span of blade 23f, with assymetrical I beam 26f shown in dotted lines behind. Any number of readily available foam systems with load transfer properties, such as urethane foams and styrene foams could be used to transfer the load between the sides of profile 29f.

Figure 15:
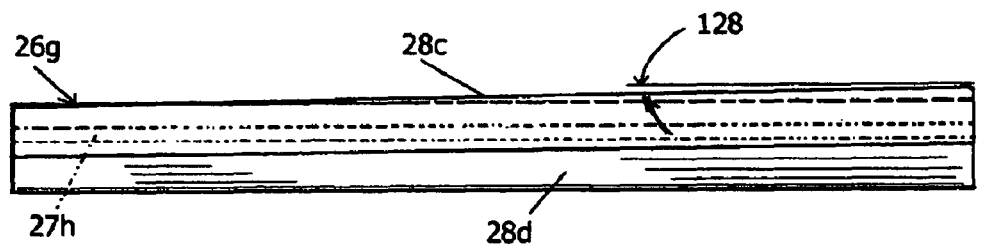
FIG. 15 is a part drawing of an alternate shape for the composite blade beam.
Figure 16:
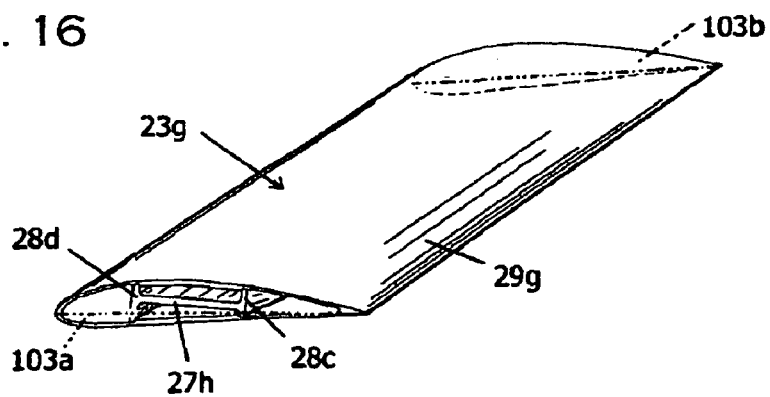
FIG. 16 is an isometric drawing of a composite blade twisted along its longitudinal axis.

32. FIGS. 15 and 16 illustrate how the two part blade assembly 23g might be used to introduce a twist into a uniform cross section blade, desirable in many small to medium sized horizontal axis blade turbines. Referring to FIG. 16, chord line 103a of airfoil profile 29g in the foreground is shown as roughly horizontal, while chord line 103b in the background can be seen to be pitched upward at the trailing edge.

33. Assymetrical I beam 26g is shown in elevation in FIG. 15, with smaller flange 28c in the foreground and larger flange 28d behind. Beam 26g can be manufactured in a pultrusion process with flange 28c somewhat wider than shown in the figure. A shallow draft angle 128 (relative to the bottom of flange 28d) can be formed by linearly trimming flange 28c at the top and bottom. The spacing between contact points to the airfoil is maintained by the constant width of web section 27h, while the trailing edge is forced upward by angle 128. Profile 29g can then be produced by a thermoset system with some post cure (as is known for urethane pultrusions) or can be produced using a filled thermoplastic material or thin, laminated materials as shown in FIG. 4b, slid over I beam 26b and bonded in place.

34. A number of small and mid-scale applications for distributed power such as electrical generation in the 1 to 15 kilowatt range and water pumping using traditional multi-blade horizontals would be ideally suited to use of strong, lightweight, low cost blades as illustrated in FIGS. 15 and 16.

MODE OF OPERATION

Blade Pitch Control System

35. FIGS. 6 and 7 illustrate the operation of a simple pivoting mechanism 106. FIG. 6 additionally shows a blade leading edge 29C, a blade trailing edge 29T with the center of mass of the blade located roughly at the arrow head of character 26, (slightly forward of the center of web section 27).

36. Centrifugal force alone on the blade when the blade is at position 101c at higher rotational speed is prone to reduce the heel-in angle of blade 23. The orientation of the blade at position 101c at high speed is shown in FIG. 7 to have been influenced by pivoting action, arrow 102c, being closer to a tangential orientation than angle 29h in FIG. 6.

37. A cross flow of air at higher rotational speeds due to a partial Magnus effect or other aerodynamic forces appears to shift the effective air flow direction from arrow 100a (slow speeds) to arrow 100a" at blade position 101a. As shown by arrow 102a in FIG. 7, this local cross flow tends to increase the heel-in angle at position 101a relative to that shown in FIG. 6. In turn, this reduces the angle of attack of blade 23 at position 101a at high speed, reducing the tendency to stall at that point. Arrow 100e in the figure shows by-pass flow of air further away from turbine rotor 21.

38. By increasing the ratio of blade area to swept area, often called the solidity ratio of the turbine, this Magnus effect can be increased in the rotor design. In FIG. 7 this factor is illustrated by the relative lengths of airfoil chord distance 103c and the open area between blades, length 103o. While increasing drag at higher speeds, this approach can be used to fine tune the low wind speed response of the turbine to optimize performance in areas and installations with moderate winds.

39. An alternative interpretation of the cross flow phenomenon, not inconsistent with a Magnus effect, is slight pressure drop inside the circle of rotation of the blades due to the aerodynamic and frictional losses of the air flow passing the blades. Theories of operation are presented here to illustrate the performance of system as observed in testing.

40. Lift force at high rotational speeds from blade position 101a, indicated by vector 23L", is likely to be a major component of the overall torque. Relative velocity of blade 23 to the local air flow, 100a", is highest when the blade is approaching the prevailing wind 100b and the angle of attack may be favorable due to the increased heel-in angle.

41. At high rotational speeds with a rotor tip speed ratio greater than 1, blade 23 at position 101c is moving faster than by-pass air flow 100c. In FIG. 7, the blade can be seen as 'flying upside down' with a lower lift force 23L' (relative to 23L" at position 101b.) Though the blade is not at an ideal angle of attack, the pitching motion indicated by arrow 102c has improved the angle of attack from what it might have been remaining at angle 29h shown in FIG. 6.

42. The pivoting effect at blade position 101b at high rotational speeds is indeterminate as indicated by double headed arrow 102b. Deflection inward toward the mast by prevailing wind 100b is likely to be balanced by outward centrifugal force. At the mid-point heel-in angle shown in FIG. 6, the vector sum 100b" of the rotational velocity and the prevailing wind 100b is likely to present an advantageous angle of attack for blade 23.

43. By producing lift through about three fourths of the rotational cycle, (functionality at blade position 101d has not been analyzed) it is easy to see how Sicard, Drees and others achieved high aerodynamic efficiency in vertical axis turbines. The alternate embodiment of blade deflection system 106 shown in FIGS. 10 through 12 applies the same type of composite torque spring mechanism to replace the more complex pivot rod, mechanical spring, cams used in the cylindrical rotor designs used in this area of the prior art.

DETAILED DESCRIPTION

Cylindrical Vertical Axis Turbine

Figure 10:
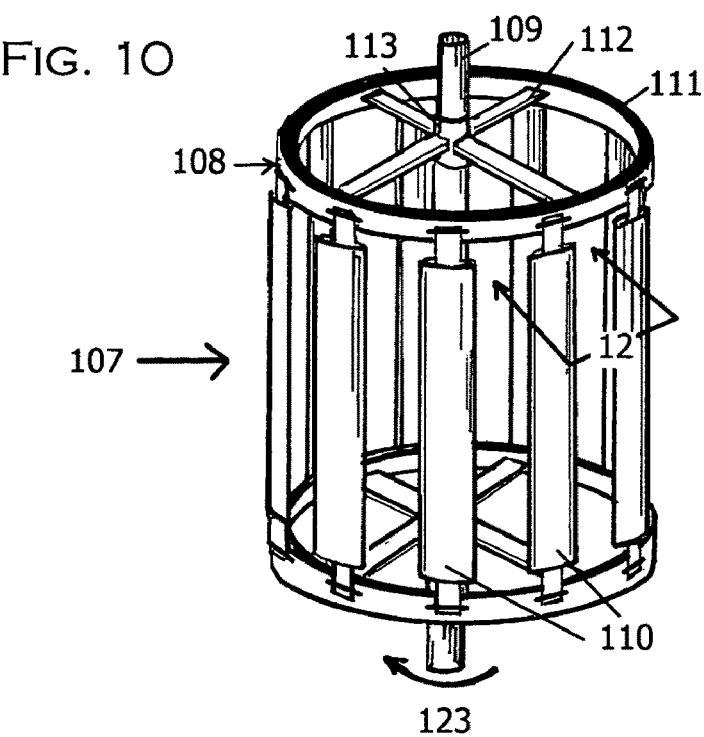
FIG. 10 is a view of an alternate embodiment of the blade structure invention.
Figure 11:
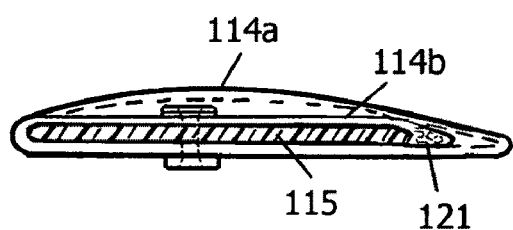
FIG. 11 is a cross section of a pivoting blade assembly using a composite sheet.
Figure 12:
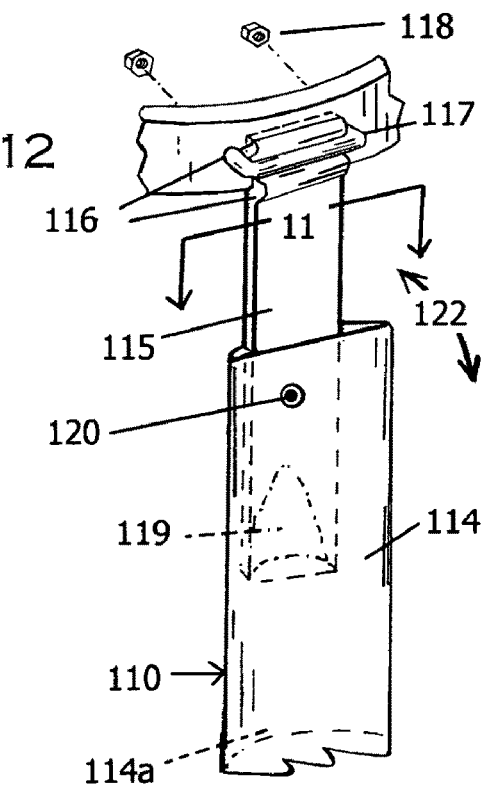
FIG. 12 is a detail isometric assembly drawing of turbine blade hubs shown in FIG. 10.

44. An alternate embodiment of the invention using the blade pivot system 106 illustrated in FIG. 7 is shown in FIGS. 10 through 12. While similar in overall geometry to the prior art of Drees/Sicard etc, the use of composite strip 115 in the pivoting of blades 110 represents a significant advance in terms of simplicity of operation, reduced parts cost and greatly reduced manufacturing costs.

45. Turbine rotor assembly 108 consists of upper and lower hoop sections 111 mounted to a central mast 109 by means of spokes 112 and mast junctions 113. Capture of wind 107 by the turbine rotor results in mechanical rotation 123 which can be tied to a generator 45 as illustrated in FIG. 2 or other driven devices based on the particular application.

46. Referring to FIGS. 11 and 12, each blade 110 is composed of an airfoil portion 114 which has a curved section 114a throughout most of its length and is flattened to a shape 114b which conforms to flattened composite strip 115 at each end. An adhesive 121 bonds the airfoil portion to the composite strip. An optional composite section 119 can be over-molded onto composite strip 115 where the transition between shape 114a and 114b occurs to prevent pull out of the strip during use. An optional rivet 120 can also be used to prevent pull out of strip 115 from airfoil portion 114.

47. A metal U-bolt 117 is shown holding blade 110 in position against hoop 112. Over-molded composite nibs 116 serve to position blade 110 at the proper level against hoop 112 and lock it in place. Nuts 118 are threaded onto U-bolt 117 to complete the assembly. Arrow 122 in FIG. 12 shows the pitch deflection of the blade throughout the rotational cycle of rotor 108 in much the same way arrows 102 a through c illustrated the mode of operation in FIG. 7.

48. Composite strip 114 is preferably a high pressure laminate composite material saw cut from a larger sheet as described in FIG. 4b. Airfoil portion 114 is preferably an aluminum extrusion to allow for low tooling and materials costs for the cylindrical turbine. Hoops 111 can either be rolled metal or a specially formed high pressure composite laminate. Spokes 112 and mast 109 are preferably made from composite pultrusions as illustrated in FIG. 4a.

49. Like turbine rotor 21 in FIG. 1, turbine rotor 108 can be easily transported and assembled on site from a compact, light weight package.

DETAILED DESCRIPTION

Solar Array Supports and Panels

Figure 17:
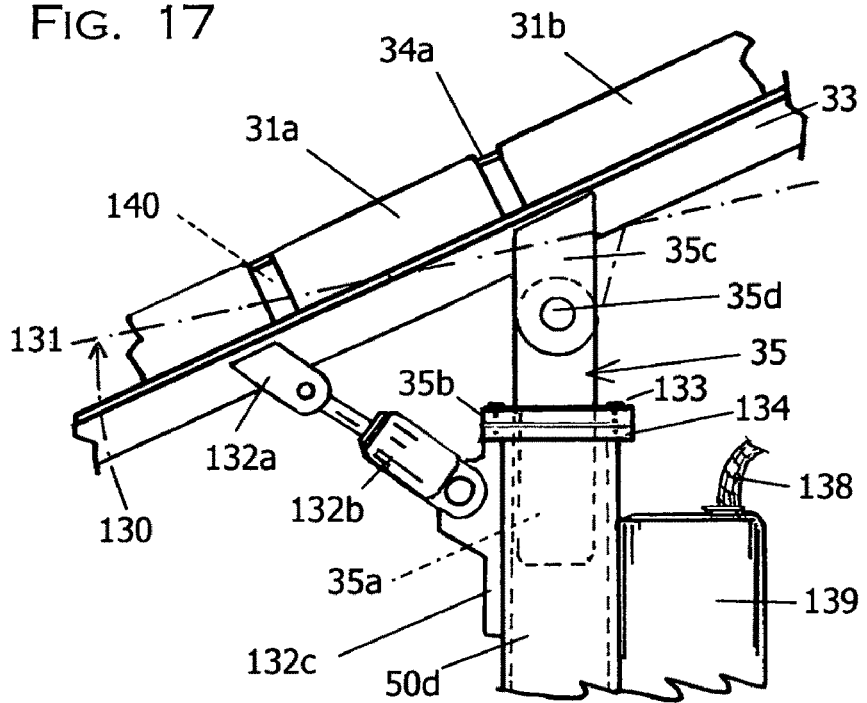
FIG. 17 is a side view elevation of the solar array structure.
Figure 18:
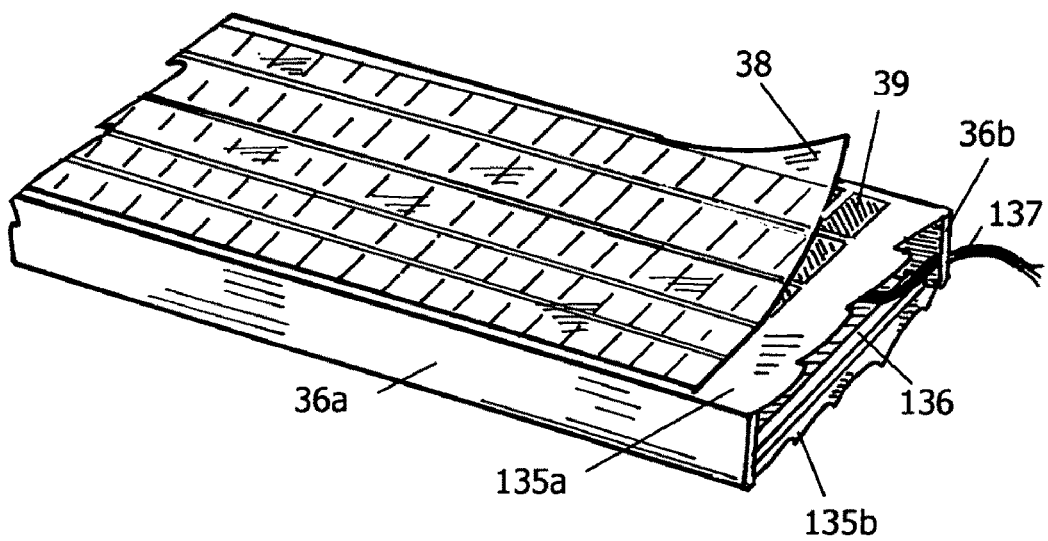
FIG. 18 is a cut away drawing of a typical photovoltaic/structural panel.

50. FIGS. 17 and 18 are detail drawings of the solar/structural array of FIG. 1 and a typical solar structural panel 31. Perimeter frame 32 has been removed from the view to see the structural attachments between the panels, the intermediate beams and the stanchion.

51. Hinged connector 35 consists of an anchor blade portion 35a which is set into a slot (as illustrated in FIGS. 2 and 3) which continues up to receive a pivot pin 35d. The blade portion passes through a lower flange 134 bonded to stanchion 50d and an upper flange 35b bonded to the anchor blade portion. Upper clevis plates 35c are attached to intermediate beam 33 and are fitted to the pivot pin in the field. Beam 33 is shown as a Tee shaped beam and is preferably made from a composite material as illustrated in FIG. 4a, but a metal beam is an acceptable alternative. The joint between the hinged connector and the stanchion is shown reinforced by bolts 133 between the upper and lower flanges.

52. Hydraulic cylinder 132b is used to pivot the deck about pin 35d and is attached to bracket 132a at the beam and bracket 132c mounted to stanchion 50d. Dash dot line 131 indicates the bottom line of beam 33 when pivoted upward (arrow 130) by the action of cylinder 132.

53. Solar structural panels 31 are pre-fabricated and pre-wired for the photovoltaic cells 39 attached to upper skin 135a. The frame of the panel consists of upper skin 135a and lower skin 135b adhesively bonded to integral purlins 36a and 36b which receive cross braces 136. Electrical output wiring 137 is shown passing through purlin 36b and in practice would lead into an inter-panel space 140 for routing to a conduit 138 which enters a voltage regulator and controller 139 mounted on stanchion 50d. Controller 139 has the same function as panel 44 in the stanchion fitted with a wind system. A weather and UV light resistant cover sheet 38 is bonded to the panel and insulates/protects photovoltaic cells 39. Cover sheet 38 is preferably made from polycarbonate, acrylic or polyvinylidene fluoride material. Since deflection resistance is provided by upper skin 135a, the weight and cost of a glass cover sheet is not needed.

I claim:
1. A blade construction for a wind turbine comprising an assembly of an airfoil profile and an unsymmetrical I beam, said airfoil profile elongated in a first direction and having;
a single interior surface having features congruent to said unsymmetrical I beam in at least three locations of contact for receiving and aligning said unsymmetrical I beam along the length of said airfoil profile, and
an exterior surface corresponding to a uniform aerodynamic shape along the length of said airfoil profile with a leading edge and a trailing edge, said leading edge and said trailing edge connected by a chord line, with said airfoil profile divided by said chord line into a convex upper side and an opposing lower side,
said interior surface being roughly congruent to said exterior surface except at said at least three locations of contact,
said unsymmetrical I beam elongated in said first direction and having perpendicular to said first direction; a web section of constant width and thickness with a roughly flat medial plane and a longitudinal central axis,
said web section integral with two flanges; a first flange near said leading edge and a second flange near said trailing edge, with both said flanges aligned roughly perpendicular to said medial plane and each having flange tips,
said flange tips positioned asymmetrically about said central axis, said first flange and said second flange having constant widths along said first direction and having variable widths, relative to one another, with
both said flanges directly bonded to said single interior surface at said flange tips along roughly parallel lines extending from said at least three locations of contact in said completed blade construction along the length of said airfoil profile,
said medial plane forming a designed angle with said chord line perpendicular to said first direction and said blade construction defining a surface of rotation during operation of said wind turbine, with
said web section, said lower side between said two flanges and said two flanges comprising a roughly triangular structural member running the length of said blade construction, and
said web section, said upper side between said two flanges and said two flanges comprising a shallow box beam structural member running the length of said blade construction
said web section comprising a principal attachment surface to said wind turbine near at least one end of said blade construction with said wind turbine additionally including; at least one mating hub that overlaps said attachment surface and conventional fasteners that secure said attachment surface to said at least one mating hub,
whereby: said triangular structural member and said box beam structural member form a tiered structural assembly running along the length of said blade construction and said tiered assembly resists deformation by aerodynamic and rotational forces incurred during operation of said wind turbine.

2. The blade construction of claim 1, wherein said first flange forms a shallow draft angle with said second flange when viewed from the perspective of said trailing edge,
said flange tips of said at least one flange directly connected to said congruent features of said single interior surface with
said attachment surface located at one end of said blade construction and with said wind turbine including one mating hub that overlaps said attachment surface and conventional fasteners that secure said attachment surface to said mating hub, with said surface of rotation lying roughly perpendicular to a rotational axis of said wind turbine.

3. The blade construction of claim 1, wherein said attachment surface is located near both ends of said airfoil profile, and with said wind turbine having two mating hubs that overlap said attachment surface near both ends of said blade construction and conventional fasteners that secure said attachment surface to said two mating hubs,
said surface of rotation being co-axial to a rotational axis of said wind turbine
whereby: said two mating hubs, said designed angle and said variable widths of said two flanges can define an initial angle of attack of said blade construction measured between said chord line and said surface of rotation.

4. The blade construction of claim 3, wherein
at least parts of said two flanges and said airfoil profile have been removed in selected areas near both ends of said blade construction, and
said attachment surface is retained near both ends of said blade construction, with said wind turbine still including; said two mating hubs that overlap said attachment surface at both ends of said blade construction and said conventional fasteners that secure said attachment surface to said mating hubs, wherein
a limited amount of torsional displacement of said blade construction about said centerline of said web section relative to said initial angle of attack can occur within said selected areas where said two mating hubs do not overlap said attachment surface in response to said aerodynamic and rotational forces,
whereby: said limited amount of torsional displacement can allow a limited change to said initial angle of attack of said blade construction during a circuit of rotation around said surface of rotation where said limited change can improve the performance of said wind turbine.

5. The blade construction of claim 1, wherein at least three locations of contact comprise three step transitions between thickened areas of said airfoil profile and relatively thinner areas of said airfoil profile at said interior surface,
each of said thickened areas having a linear extent of slightly less than the width of said web section when projected onto said medial plane,
whereby: said airfoil profile can be precisely aligned and directly bonded to said unsymmetrical I beam.

6. The blade construction of claim 1, wherein said flange tips are directly bonded to said airfoil portion using an adhesive.

7. The blade construction of claim 1, wherein
said unsymmetrical I beam is composed of a fibrous reinforcement within a matrix of resin material, with said fibrous reinforcement selected from the group consisting of;
fiberglass unidirectional rovings and stitched triaxial fiberglass fabric and non-woven glass fabric and 0/90 glass fabrics,
and said resin material is selected from the group consisting of; epoxy polymers and urethane polymers and phenolic polymers and polyester polymers and vinyl based polymers.

8. The blade construction of claim 1, wherein said overlap between said principal attachment surface and said at least one mating hub occurs within said shallow box beam structural member.

9. The blade construction of claim 1, wherein said overlap between said principal attachment surface and said at least one mating hub occurs within said roughly triangular structural member.

10. A strut for a wind turbine comprising a tubular profile and an I beam,
- said tubular profile elongated in a first direction and having;
- a single interior surface having features congruent to said I beam in four locations of contact for receiving and aligning said I beam along the length of said tubular profile,
- said I beam elongated in a first direction and having perpendicular to said first direction;
- a web portion integral with two flanges, each having two flange tips said web portion having a medial plane perpendicular to each of said two flanges and a longitudinal central axis parallel to each of said two flanges, with said two flanges directly bonded to said interior surface at said flange tips along roughly parallel lines extending from said four locations of contact, along the length of said I beam,
- said tubular profile having a roughly cylindrical exterior surface, with said interior surface being roughly congruent to said exterior surface except at said four locations of contact, said web portion comprising a principal attachment surface to said wind turbine near both ends of said strut with said wind turbine additionally including two mating hubs that overlap said attachment surface and conventional fasteners that secure said attachment surface to said two hubs,
- whereby: said tubular profile can be strengthened at midspan and said two hubs can be additionally utilized with other wind turbine components.

* * * * *